United States Patent [19]

Lucchi et al.

[11] Patent Number: 4,533,915

[45] Date of Patent: Aug. 6, 1985

[54] RADAR TERRAIN SIGNAL SUPPRESSOR

[75] Inventors: George A. Lucchi, Granada Hills; Jalal Alisobhani, Northridge, both of Calif.

[73] Assignee: Sperry Corporation, New York, N.Y.

[21] Appl. No.: 349,121

[22] Filed: Feb. 16, 1982

[51] Int. Cl.³ .......................... G01S 13/95; G01S 7/28
[52] U.S. Cl. .................................. 343/5 W; 343/7 A; 343/5 DP; 343/17.1 R
[58] Field of Search ............ 343/5 CE, 5 CF, 5 DP, 343/5 W, 7 A, 17.1 PF, 17.1 R

[56] References Cited

U.S. PATENT DOCUMENTS

| | | | |
|---|---|---|---|
| 3,370,292 | 2/1968 | Deerfield | 343/5 R |
| 3,610,901 | 9/1969 | Lynch | 343/5 DP |
| 3,781,878 | 12/1973 | Kirkpatrick | 343/5 W |
| 4,296,415 | 10/1981 | Pelton et al. | 343/7 A |
| 4,318,100 | 3/1982 | Shimizu | 343/5 W |

OTHER PUBLICATIONS

M. Castets, *Ronsard Meteorological Radar*, Electrical Communication, vol. 52, No. 2, 1977, pp. 146–151.
B. Nutten et al., *The RONSARD Radars: A Versatile C-Band Dual Doppler Facility*, IEEE Tran. Geoscience Elec., vol. GE-17, No. 4, Oct. 1979, pp. 281–288.

Primary Examiner—T. H. Tubbesing
Assistant Examiner—Gilberto Barron, Jr.
Attorney, Agent, or Firm—Howard P. Terry

[57] ABSTRACT

An apparatus for the suppression of terrain generated clutter in a pulsed weather radar system. Weather induced returns typically having scintillation frequencies greater than 50 Hz may be isolated from terrain backscattered signals utilizing a digital filter technique having a sampling rate equal to the pulsed radar PRF.

6 Claims, 2 Drawing Figures 4,533,915

RADAR TERRAIN SIGNAL SUPPRESSOR

BACKGROUND OF THE INVENTION

1. Field of the Invention

This invention pertains to the field of weather radar and more specifically to an apparatus for the suppression of unwanted terrain generated radar backscatter signals with minimal alteration to weather backscatter signals.

2. Description of the Prior Art

Airborne weather radar systems are specifically designed to detect and display rainfall intensities when flying at various altitudes. In such systems the antenna beam may be aimed downward since the rain appears below the freezing level; consequently the rain backscatter signals may become cluttered by ground terrain signals which can appear in the antenna mainlobe or sidelobes at the same range as the storm cell. The backscattered terrain signals may alter the intensity of the backscattered signals received from the storm cell or even obscure them altogether. It is therefore desirable to be able to separate the storm cell backscattered signal from the terrain backscattered signal so that the weather signal may be analyzed with a minimum of alteration.

Prior art attempts to isolate the weather signal from terrain clutter have been largely unsuccessful. A major portion of the scintillation frequencies from terrain radar returns fall below 50 Hz while those from storm cell radar returns are in the range of 50 to 450 Hz. One method for isolating frequencies in the range of 50 to 450 Hz from those in the region below 50 Hz may comprise a filtering technique. Simple lumped constant analog filtering techniques, however, are not applicable to the return from pulsed radar, due to the brief duration of the samples available as a video signal in such a system. Lumped constant filtering techniques are generally too costly to implement to achieve good results. Attempts using high frequency doppler radar to differentiate between a moving storm cell and stationary terrain have been unsuccessful since the storm cells do not move quickly enough. Another method which has been used includes reading the clutter signal in isolation, storing the clutter signal, and subtracting the stored clutter from the real time combined weather plus clutter signal. This method may be inaccurate or difficult to implement since it is difficult to take a reading to the terrain without the presence of the backscattered weather signal and it cannot accurately take into account changes in the terrain backscattered signal. The present invention provides a means by which the separation of weather (rain) backscattered and terrain backscattered signals may be realized to permit the detection of rainfall intensities with a minimum of interference from terrain reflected signals.

SUMMARY OF THE INVENTION

The present invention provides a system for the isolation of weather induced scintillation frequencies from terrain induced frequencies in a pulsed radar return. A signal input stage provides signal samples representative of received radar signals and sampled at the pulse repetition frequency of the radar system. The signal samples may be binary encoded. The encoded binary signals are digitally processed sequentially so that successive signal samples are selectively added and subtracted and multiplied by predetermined constants in accordance with a desired transfer function. The resulting signal is compared to a predetermined threshold signal, which may also be of binary form and a compared signal is generated indicative of whether or not the digitally processed signal is greater than or less than the predetermined threshold value.

DESCRIPTION OF THE PREFERRED EMBODIMENT

Figure 1:
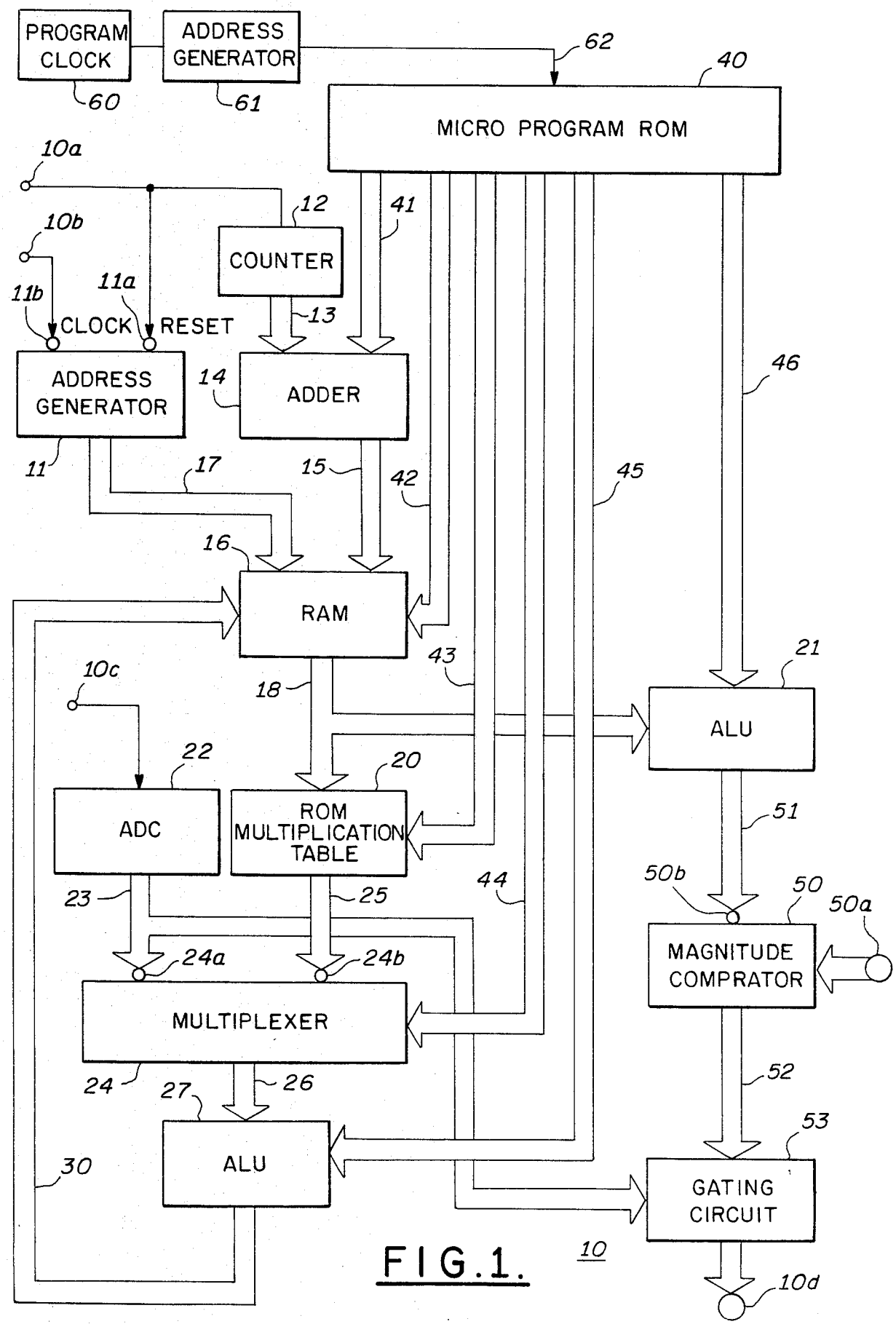
FIG. 1 is a block diagram of the invention showing its components and their interconnections.

Referring to FIG. 1, a radar terrain signal suppressor 10 as embodied in the present invention may comprise pulse repetition frequency input terminal 10a coupled to reset terminal 11a of address generator 11 and further coupled to an input terminal of counter 12. Counter 12 is coupled via multiconductor cable 13 to digital adder 14 which in turn is coupled from output terminals thereof via multiconductor cable 15 to Random Access Memory (RAM) 16. System clock pulses may be applied to terminal 10b which are then coupled to clock input terminal 11b of address generator 11 which is in turn coupled to RAM 16 via multiconductor cable 17. The output signal of RAM 16 is coupled to read only memory (ROM) 20 and further coupled via multiconductor cable 18 to an arithmetic logic unit (ALU) 21. Analog video frequency data is coupled to input terminal 10c, which is in turn coupled to analog-to-digital converter (ADC) 22, the output signal of which is coupled via multiconductor cable 23 to multiplexer 24. An output signal via multiconductor cable 25 available from ROM 20 is also coupled to multiplexer 24. The output signal from multiplexer 24 is coupled via multiconductor cable 26 to a further arithmetic logic unit (ALU) 27 which is further coupled to RAM 16 via multiconductor cable 30. Microprogram ROM 40 which controls the execution of digital filter functions is coupled via multiconductor cables 41, 42, 43, 44, 45, and 46 to adder 14, RAM 16, ROM 20, first ALU 27 and second ALU 21, respectively. Program clock 60 generates clock pulses which are coupled to address generator 61. Address generator 61 will generate a multibit address used to select the next instruction in microprogram ROM 40 and coupled thereto via multiconductor cable 62. Output signals from second ALU 21 are coupled to input terminal 50b of magnitude comparator 50, via multiconductor cable 51. A reference signal is coupled to input terminal 50a of comparator 50. The output signal of magnitude comparator 50 is applied via conductor cable 52 to gating circuit 53 which in turn is coupled to output terminal 10d. Analog-to-digital converter 22 is further coupled via lead 23 to an additional input terminal of gating circuit 53.

Clutter targets such as buildings, bare hills, or mountains produce echo signals that are constant in both phase and amplitude as a function of time. Many types of clutter, however, are not constant such as echoes received from trees, vegetation, the sea and rain, since these may not remain stationary at all times. If the individual scatterers, and the scattering centers remain fixed from pulse to pulse, the resultant echo signal will also remain fixed. Any motion of the scatterers, however, relative to the radar will result in different phase relationships at the radar receiver, thus causing scintillation. It has been observed experimentally that the echo from weather targets such as rain or storm cells, scintillates much faster than the echoes from the ground or terrain. In a system designed to observed weather, such as in an airborne weather radar, echoes returned from the ground may obscure the signal and are therefore considered clutter. It is thus desirable to eliminate the clutter without altering the signal received from the rain. It has been found that the frequency spectra of the ground, including heavily wooded hills, is concentrated below 50 Hz for a radar system operating at 10 gHz. The frequency spectra for a rain cloud, however, is above 50 Hz and may extend to 450 Hz, while being primarily concentrated in the region between 50 to 200 Hz.

In a pulsed radar a pulse is generated and used to illuminate targets along the boresight of the antenna. Assuming that there are more than one target spaced at varying distances along the boresight from the antenna, it is clear that the energy reflected from targets closest to the antenna will be returned to the antenna before echoes return from targets further from the antenna. If the time it takes each echo to return from a given pulse is noted, that time may be used to determine the range or distance from the antenna at which a target or targets are found according to the equation $R=ct/2$, where R equals the range from the antenna, c equals the speed of light, and t equals the time elapsing between transmission and reception of the radar pulse.

In most weather radar systems there are 256 range bins or resolution cells which are arranged and constructed to isolate radar returns on the basis of the time, t, needed for the radar return to reach the antenna. The range bins will have a resolution on the order of $ct/2$, where t equals the pulse width. In order to obtain range resolution on the order of 1 nautical mile, a time period of 12.35 microseconds between adjacent range bins is required.

Figure 2:
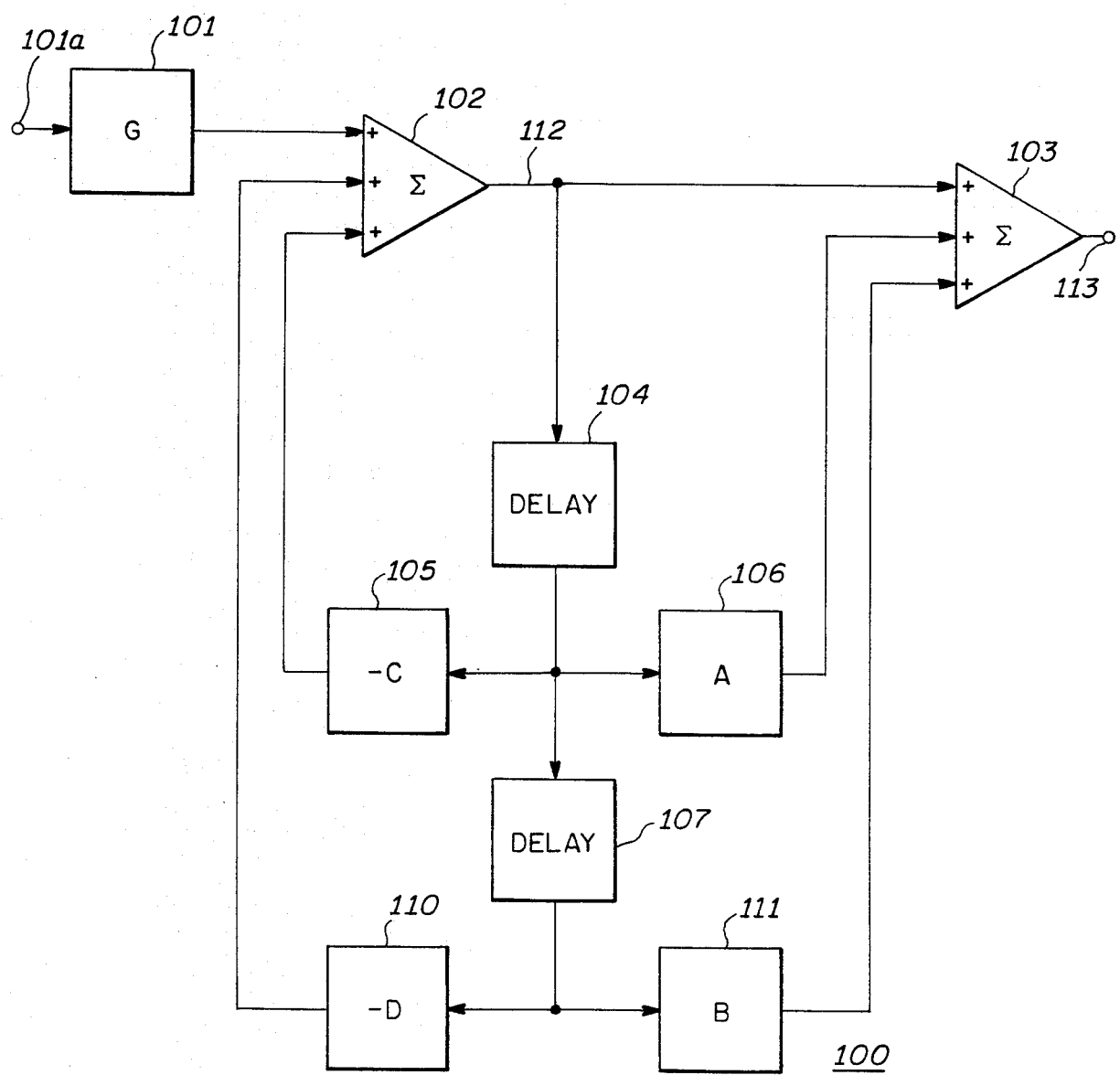
FIG. 2 is a block diagram of a digital filter useful in explaining the operation of the invention.

FIG. 2 shows a canonical configuration of a digital filter that may be used to implement any realizable filter. Digital filter 100 of FIG. 2 comprises constant multiplier 101 having an input terminal 101a to which the signal desired to be filtered is applied. The output terminal of constant mulitplier 101 is coupled to an input terminal of summer 102, the output terminal of which is coupled to an input terminal of summer 103 and further coupled to an input terminal of delay 104. The output terminal of delay 104 is in turn coupled to constant multipliers 105 and 106 which are in turn coupled to second input terminals of summers 102 and 103, respectively. The delayed output signal from delay 104 is further coupled to an input terminal of delay 107, the output signal of which is in turn coupled to constant multipliers 110 and 111, the output signals of which are coupled to third input terminal of summers 102 and 103, respectively.

The operation of the digital filter of FIG. 2 may be understood in terms of the following equations:

$$W(n)=GX(n)-CW(n-1)-DW(n-2) \quad (1)$$

$$Y(n)=W(n)+AW(n-1)+BW(n-2) \quad (2)$$

where $X(n)$ is the signal applied to input terminal 101a, $W(n)$ is the signal present at the output terminal of summer 102 on lead 112, and $Y(n)$ is the signal available at the output of summer 103 and terminal 113. The notation (n) indicates the present pulse, and $(n-1)$ and $(n-2)$, respectively, indicate pulses occurring one and two pulses previous to the present pulse.

In order to generate this equation, constant multiplier 101 multiplies radar return digital data applied at terminal 101a by a multiplicative constant G, while constant multipliers 105, 106, 110, 111 and multiply signals applied to their respective input terminals by constants $-C$, A, $-D$, and B, respectively. Delays 104 and 107 delay the signal applied to their input terminals by one clock period. Thus data presented to the input terminal of delay 104 will appear at an output terminal of delay 104 one clock pulse after the application of data to its input terminal. Operation of delay 107 is similar. Summers 102 and 103 may be digital adders which perform the arithmetic operation of addition to the data applied to the input terminals.

Selection of the appropriate values for constants A, B, C, and D will yield the filter transfer function it is desired to synthesize.

Since the frequencies of interest are found between 50 to 450 Hz, conventional digital filter design requires that the input signal be sampled at twice the maximum frequency, or in other words, 900 Hz. A digital filter having a 50 Hz corner frequency and a 900 Hz sampling rate would, however, require internal operation with a 12 bit accuracy which would increase the complexity of the system. Since it is desired only to detect the presence of a frequency above 50 Hz and not to reproduce the original input signal, the above problem may be overcome by taking advantage of the fold over in frequency that occurs when the input signal is sampled at less than twice the maximum frequency. For example, choosing a PRF of 480 Hz, which in turn governs the sampling rate, will cause frequencies above 240 Hz to fold back to frequencies below 240 Hz. For example, a 270 Hz signal, which is 30 Hz greater than 240 Hz, will be folded back to 210 Hz, or 30 Hz less than 240 Hz. Furthermore, a signal of 430 Hz would be folded back to 50 Hz. Since we are rejecting signals below 50 Hz, signals above 430 Hz will also be rejected. Thus by taking advantage of the fold over in frequency, the digital filter will behave as a bandpass filter in the region of 50 to 430 Hz which is the prime region of interest for detecting storm cells.

The operation of the digital filter of the instant invention will be explained according to equations 1 and 2 and FIG. 2 which describe a 2nd order filter. It will be clear to those skilled in the art that the present invention may be extended to filter functions having higher than second order transfer functions.

Referring again to FIG. 1, a microprogram ROM 40 generates the required control signals to calculate W(n) and Y(n). The value of W(n) will be stored in the appropriate location of RAM 16 in place of the value of $W(n-2)$ previously stored therein. Address generator 11 as modified by adder 14 will then point to the location of $W(n-2)$ and $W(n-1)$ of the next range cell so that the new input corresponding to that range cell can be filtered. The sequence will terminate upon completion of the calculations for the 256th range cell; the system is reset by the next pulse received at input 10a.

Program clock 60 generates a series of pulses which are coupled to address generator 61 which may be, for example, a counter. Address generator 61 is, in turn, coupled to microprogram ROM 40 and selects the address of the instructions contained therein. The pulse repetition frequency is coupled to terminal 10a which is in turn coupled to reset address generator 11 at reset terminal 11a and to counter 12. The pulse repetition frequency may be, for example, 480 Hz. In the instant invention if a resolution of 256 ranges per transmission strobe is utilized, it will be necessary to calculate Y(n) 256 times for each transmission strobe, or in other words, approximately once every 4 microseconds for a maximum desired range of 100 nautical miles. Thus address generator 11 will need to present a new address to RAM 16 once every 4 microseconds for each range cell's sample. Microprogram ROM 40 thus generates instructions and addresses at a rate faster than the system clock rate which is in turn faster than the PRF. Therefore program clock 60 will have a higher frequency than either the system clock or PRF. The number of steps that microprogram ROM 40 generates for each range bin will be dependent upon the order of the transfer function being synthesized and may be approximately 4 steps for a 2-pole filter or 7 steps for a 4-pole filter. It will be clear to those skilled in the art that the program clock, system clock and PRF may be tied to one another so that, for example, the program clock increments address generator at the rate of 1 count for each completed sequence of steps performed by microprogram ROM 40, while the PRF may be derived from the system clock signal at a rate of 1 pulse for every 256 system clock pulses.

The video signal from the radar is applied to input terminal 10c where it is coupled to ADC 22 which provides a binary representation, for example, an 8 bit word corresponding to the amplitude of the received video signal.

Video signals presented to the terminal 10c are converted into 8 bit words and multiplied by a constant factor G in ADC 22 and coupled via multiconductor cable 23 to gating circuit 53 and multiplexer 24. In one embodiment gating circuit 53 is utilized in a color radar system for switchably coupling video signals encoded according to a color weather radar display, in response to gating signals applied via cable 52. The signal thus coupled to input port 24a of Multiplexer 24 corresponds to GX(n) as described in equation 1. Multiplexer 24 under the control of microprogram ROM 40 via lead 44, switchably couples the GX(n) term to ALU 27 which is also under control of microprogram ROM 40 via lead 45.

Operation of the digital filter is best understood by assuming that values of W(n−2) and W(n−1) for a given range bin have already been stored in locations 000000000 and 000000001, respectively in RAM 16 and are available for further processing.

It is further convenient to assume that operation begins with the first transmission strobe in a series and the range bin for which a calculation is being made is the first range bin of the 256 available range bins. System clock signals applied to terminal 10b and coupled to address generator 11 will in combination with signals received from adder 14 address RAM 16 to read the word W(n−2) from RAM 16 from its output port 16a. For a filter having a 2 pole transfer function, since one of two previous pulses must be addressed, counter 12 may be implemented with a simple binary counter such as, for example, a flip-flop which has an output signal of 0 for the first pulse and 1 for the second. Similarly for a 2-pole filter the microprogram ROM 40 will generate a binary output signal of 0 or 1 on multiconductor cable 41. The signals on leads 13 and 41 are added in adder 14. In the present example assuming a value of 0 on lead 13 and a value of 0 on lead 41, adder 14 will generate an output signal corresponding to the sum of 0+0=0 on multiconductor cable 15. For the case of 256 range bins address generator 11 will generate up to 256 different addresses, ranging from 0 through 255. It may be assumed that for the first range bin the address would be 00000000. The complete address applied to RAM 16 at this stage of processing is 000000000. Counter 12 thus keeps track of the particular pulse or transmission strobe, address generator 11 keeps track of the range bin for which filtering is to take place, and microprogram ROM 40 keeps track of the particular program step in the filtering sequence. As will be further explained hereinbelow, the generation of the address of words in RAM 16 by means of counter 12, adder 4, and ROM 40 permits substantial economies in both hardware and software.

In a 2-pole filter it is necessary to store each of the data words generated for each of the 256 range bins for a total of 2 pulses, whereas in a 4-pole filter it is necessary to store a complete set of words for each range bin for a total of 4 pulses. In the embodiment shown, signals coupled via line 17 determine which of the 256 range bins the digital filter processes at any particular moment while the signal applied via multiconductor cable 15 determines which pulse in the series of pulses. Thus, for example, multiconductor cable 17 will need to be able to carry an 8-bit word to address data for $2^{8th}$ or 256 range bin location. In the case where there is a 2-pole filter multiconductor cable 41 will only need to address a 1 bit word to address which of the two previous pulses (n−2), or (n−1) needs to be read or written into RAM 16 at a given point of processing.

In addition to the address, a read enable signal must be coupled to RAM 16 in order to read the word in present example, W(n−2) from RAM 16. The read enable signal is generated by ROM 40 and coupled to RAM 16 via multiconductor cable 42. When it is desired to write a word into the RAM in the position addressed by a multiconductor cable 17 and 15, a write enable signal is applied to the multiconductor cable 42 from microprogram ROM 40 and that word will consequently be stored in the addressed location in RAM 16.

Having read the word W(n−2) from RAM 16, it is coupled to ROM 20 which is a multiplication look-up table under microprogram control of ROM 40. As will be further explained hereinbelow, the word W(n−2) is also applied to ALU 21 via multiconductor cable 18 for processing therein. There are $2^{8th}$ or 256 possible 8-bit words. The values of each word multiplied by selected multiplicative constants A, B, C or D are stored in appropriate locations in ROM 20 and the product made available for further processing. In the present example, after the word W(n−2) has been read from RAM 16, the first step performed to calculate the term W(n) according to equation 1 is multiplying that term by the multiplicative constant D. Thus the word presented via multiconductor cable 18 from RAM 16 and the instructions presented from microprogram ROM 40 via multiconductor cable 43 will combine to form the address of the location of the value for the word DW(n−2) which word is subsequently addressed and read. Multiplexer 24, responsive to signals received from ROM 40 via lead 44 then selects the word DW(n−2) from multiplication ROM 20 applied to its input port 24b and couples the word to ALU 27 via multiconductor cable 26 where it will be transferred to the output of ALU 27 by appropriate control signal from ROM 40 through multiconductor cable 45. Thus the value in ALU 27 at this point equals $-DW(n-2)$.

The output signal from microprogram ROM 40 on multiconductor cable 41 will now increment to 1 thus changing the address presented to RAM 16 by address generator 11 and adder 14 to read 000000001. The value of $W(n-1)$ was previously stored in this location in RAM 16. In the same manner as used for the generation of the value $DW(n-2)$ from the value $W(n-2)$, the value of $CW(n-1)$ is generated by ROM 20 from the value $W(n-1)$ by reading from the look-up table stored in ROM 20. Multiplexer 25 will now receive an instruction from ROM 40 to switchably couple the value $CW(n-1)$ from ROM 20 to ALU 27 where it will be subtracted from the value previously stored in ALU 27, thus generating the term $-CW(n-1)-DW(n-2)$.

In the next step multiplexer 24 under the control of microprogram ROM 40 via lead 44 internally switches to couple input port 24a and the signal $GX(n)$ thereat to the output port of multiplexer 24 and multiconductor cable 26. The signal $GX(n)$ is thus coupled to ALU 27 which is then instructed to add the term $GX(n)$ to the sum previously stored therein to calculate the value $W(n)=GX(n)-CW(n-1)-DW(n-2)$ in accordance with equation 1. This new value of $W(n)$ is then read via multiconductor cable 30 into RAM 16 at the address 000000000 in place of $W(n-2)$.

As previously stated, the term $W(n-2)$ was also read into ALU 21 and added to the contents thereof. In one embodiment of the invention the values of A and B are chosen to be equal to either 1, 0 or 2 depending on the transfer function desired and thus additional multiplication tables are not required before further calculation in ALU 21. Thus a value corresponding to $BW(n-2)$ is transferred to the output of ALU 21. Hence the content of ALU 21 becomes $BW(n-2)$. Similarly when the term $W(n-1)$ was read out of RAM 16 and applied to multiplication table ROM 20, it was also applied via multiconductor cable 18 to ALU 21 which term will thus correspond to the term $AW(n-1)$ which is added to the contents of ALU 21 therein to yield the value $AW(n-1)+BW(n-2)$. Simultaneously with the entering of the newly calculated value of $W(n)$ into the old location of $W(n-2)$ in RAM 16, the value of newly calculated $W(n)$ is applied to ALU 21 and added to the contents thereof to generate $Y(n)=W(n)+AW(n-1)+BW(n-2)$.

The computed value of $Y(n)$ may then be compared to a reference threshold value (8-bit word) coupled at terminal 50a of magnitude comparator 50. At this point, however, the system clock signal will increment by 1, indicating that the next range bin, i.e., range bin number 2, is to be addressed and the process will begin for values in range bin number 2. This process will continue until range bin number 255 is reached, at which point a new pulse will be generated on line 10a which will now increment counter 12 by a value of 1. This second pulse resets address generator 11 thereby causing it to begin at range bin 1 again. Since counter 12 is a binary counter it will now generate an output signal on multiconductor cable 13 equal to a value of 1, which value, when added to the value of 0 generated on multiconductor cable 41 by microprogram ROM 40 corresponding to the initial step of the microprogram ROM 40's program, yields a value of 1 on multiconductor cable 15. Thus the first step of the program will no longer read out the data word stored in location 000000000 but rather will read out the data word stored in location 000000001, in correspondence to the value previously stored therein.

Thus the value stored earlier therein, and used as the value $W(n-1)$ for the immediately previous calculation corresponding to range bin number 1, is now treated as the new $W(n-2)$ by microprogram ROM 40. This result is desirable since the pulse that was immediately previous $(n-1)$ to a given pulse, is by definition two pulses prior $(n-2)$ on the next pulse. Similarly, since the count on line 13 remains at 1 for the duration of the processing for all range bins during the second transmission strobe, all addresses addressed by microprogram ROM 40 will be shifted by 1, and thus, for example, the value $W(n)$ which had previously been stored in the location 000000000 will at the end of the program be stored in location 000000001. Since the same microprogram is used to address data words whose significance changes with each PRF, memory requirements and/or the length of the microprogram are reduced, thereby increasing processing speed.

Should the digital word $Y(n)$ coupled to magnitude comparator 50 be greater than the reference threshold word also applied to comparator 50, it will switch gating circuit 53 on thereby coupling signals on multiconductor cable 23 to output terminal 10d. The reference threshold value is selected to be equal to the desired filter corner frequency which corresponds to 50 Hz in the preferred embodiment. The signal applied to magnitude comparator 50 via lead 51 will correspond to the frequency of the signal in a particular range bin. The present invention is concerned with those frequencies having values greater than approximately 50 Hz signals below which are assumed to be the result of terrain induced clutter. Gating circuit 53 is thus responsive to simple yes/no decisions as to whether or not the signal being sampled at input terminal 20c is generated by weather or terrain. When the signal is generated by weather the appropriate color for that weather intensity may be presented on a color radar display.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a pulsed weather radar system including a pulse transmitter and a receiver wherein radar echo pulses are detected to provide video signals, the improvement comprising:

input means for providing digital signals representative of video signals derived by detecting radar echoes received in response to pulses transmitted from said pulse transmitter, said video signals containing weather induced video signal components at weather induced signal frequencies and terrain clutter video signal components;

microinstruction generator;

memory means coupled to said microinstruction generator having an address port and an output port for the storage and retrieval of digital words in locations indicated by signals coupled to said address port, said storage occurring in response to write signals received from said microinstruction generator and said retrieval occurring in response to read signals received from said microinstruction generator;

multiplying means having an output port, and input port coupled to said memory means output port, and further having an instruction port coupled to said microinstruction generator, for the multiplication of signals applied to said multiplication means input port by the constants C and D as selected by said microinstruction generator, and coupling said multiplied signal to said output port thereof;

multiplexing means having first and second input ports, an output port, and an instruction terminal, said first input port being coupled to said signal input means, said second input port being coupled to said multiplication means, and said instruction terminal being coupled to said microinstruction generator, for switchably coupling signals received from said first input port and said second input port to said mulitplexer output port responsive to signals received from said microinstruction generator;

first arithmetic logic unit means having an input port coupled to said multiplexer means output port, an output port coupled to said memory means addressing port, and an instruction port coupled to said microinstruction generator, for adding, subtracting and transferring signals applied to said input port in accordance with instruction signals received at said instruction port and for providing added, subtracted and transferred signals at said output port;

second arithmetic logic unit means having an instruction port coupled to said microinstruction generator means, an input port coupled to said memory means output port, and an output port, for adding, subtracting and transferring signals applied to said second arithmetic logic unit means input port in accordance with instruction signals received at said instruction port for stopping digital signals representative of said terrain clutter video signal components and providing digital signals representative of said weather induced video signal components at said output port;

comparator means coupled to said output port of said second arithmetic logic unit for comparing said digital signals representative of said weather induced video signal components with a digital threshold signal to provide relative level representative signals; and gate means coupled to said comparator means to receive said relative level representative signals and to said input means to receive said digital signals representative of said video signals for coupling said representative digital signals to an output terminal when said relative level representative signal indicates that said digital signals representative of said weather induced video signal components exceed said digital threshold signal, thereby coupling said video signals representative digital signals from said input means to said output terminal.

2. The apparatus according to claim 1 wherein said multiplier means comprises a read only memory, having a multiplication look-up table stored therein.

3. The apparatus according to claim 2 wherein said memory means comprises:

random access memory having a plurality of addressing terminals;

counter means having an input terminal coupled to receive pulses at said pulse repetition frequency for providing pulses at a repetition rate that is established by dividing said pulse repetition frequency by a preselected number;

adder means having first input means coupled to said counter means and second input means coupled to said microinstruction generator, for adding signals applied to said first and second input means and for providing a signal representative thereof to a first set of terminals included in said plurality of addressing terminals of said random access memory; and address generator means having first input terminal means coupled to receive system clock pulses and having second input terminal means coupled to receive pulses at said pulse repetition frequency means, and having output terminal means coupled to a second set of terminals included in said plurality of addressing terminals of said random access memory, for generating binary numbers in correspondence to sequentially received system clock pulses.

4. The apparatus according to claim 3 wherein said instruction generator means comprises:

program clock generator means for generating pulses at a preselected rate;

address generator means coupled to said program clock generator means for generating addressing signals in correspondence to successive pulses received from said program clock generator means; and microprogram read only memory means coupled to receive said addressing signals for providing instruction signals stored at addresses in said read only memory to output ports of said read only memory in response to said addressing signals.

5. The apparatus according to claim 4 wherein said second arithmetic logic unit includes means for providing a stop band, corresponding to terrain clutter video signal components, for rejecting digital signals representative of video signal components at frequencies below 50 Hz and a pass band, corresponding to weather induced video signal components, for passing digital signals representative of video signal components at frequencies above 50 Hz.

6. The apparatus according to claim 5 wherein said input means includes means for sampling said radar echoes at a rate equal to said radar system pulse repetition rate which is equal to the highest weather induced signal frequency of interest.

* * * * *